United States Patent Office 3,354,203
Patented Nov. 21, 1967

3,354,203
PREPARATION OF OMEGA-AMINO ACIDS
John C. Little, Midland, Mich., assignor to The Dow Chemical Company, Midland, Mich., a corporation of Delaware
No Drawing. Filed Nov. 4, 1963, Ser. No. 321,355
9 Claims. (Cl. 260—534)

This invention concerns a method for preparing omega-amino acids, i.e., amino carboxylic acids having the amino group substituent in the omega position.

The catalytic reduction of cyano acids to the corresponding amino acids has been virtually unknown, and in most instances reported, yields are low and the product is contaminated with by-products which are difficult to remove. Aside from the usual problem encountered in the catalytic reduction of nitriles, that of secondary amine formation which takes place when nickel or cobalt is used as a catalyst, even in the presence of ammonia, there is the problem of attack of the catalyst itself by the carboxylic acid function. Finely divided nickel, for example, is reportedly readily attacked by acids. This observation has been confirmed. It has also been confirmed that cobalt catalysts are likewise subject to acid attack under otherwise suitable conditions.

Secondary amine formation has been repressed by carrying out the reduction in the presence of an acylating agent such as acetic anhydride, which converts the primary amine to an amide as it is formed, thus preventing secondary amine formation. However, in an industrial process this is usually not practical due both to the cost of the acid anhydride and the extra step required (amide hydrolysis) to obtain the free primary amine.

Secondary amine formation has reportedly also been repressed by addition of ammonia and large amounts of catalyst when nickel or cobalt catalysts are used, but these measures are sometimes not effective and they are especially ineffective in the present case, reduction of ω-cyanoacids.

The problem of attack of the finely divided nickel or cobalt catalyst has been partially solved in the past by converting the carboxylic acid to an ester prior to reduction. This procedure is undesirable because of the two extra steps involved (esterification of the cyanoacid and hydrolysis of the amino ester) and because polymerization of the amino ester takes place very readily.

An alternative to conversion of the carboxylic acid to the ester is that of reacting with a strong base to form the acid salt prior to reduction. However, this procedure suffers from the drawback that the resulting amino acid salt must be freed from the cation of the strong base to obtain the free amino acid, and this is usually a very difficult process. Also, the nitrile group may hydrolize if excess strong base and water are present.

Freifelder, J.A.C.S. 82 (1960): 2386, claims low-pressure reduction of certain nitriles using rhodium catalysts. Cyanoacids, however, are not discussed.

The following reduction has also been reported:

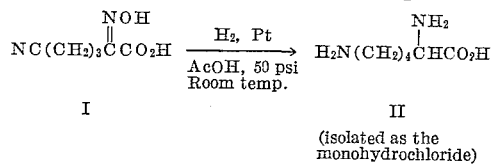

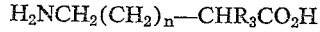
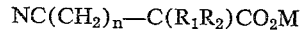

In addition to the problem of recovery of the lysine from the acetic acid solvent (II was isolated as the HCl salt), the highest reported yields were quite low (36–43 percent) and the work-up was quite tedious. During the course of their investigations, the same workers reported that both Raney nickel and precious metals were ineffective as catalysts for the reduction of I in ethanolic ammonia or ethanolic HCl. They also found that the "nickel complex" of I could not be reduced in ethanolic ammonia.

It has now been discovered that ω-amino acids having the formula $$H_2NCH_2(CH_2)_n—CHR_3CO_2H$$

wherein $n$ is an integer from 0 to 9 and $R_3$ is one of H and $NH_2$, can be prepared by hydrogenating ω-cyano-acids having the formula $$NC(CH_2)_n—C(R_1R_2)CO_2M$$

wherein $n$ is an integer from 0 to 9, $R_1$ and $R_2$ individually are H and when taken together are $=NOH$, and M is one of H and $NH_4$. Advantageously, the cyanoacid is dissolved in an inert solvent such as water or aqueous ammonium hydroxide, a small amount of ruthenium catalyst is added thereto and the cyanoacid is then hydrogenated with hydrogen or a hydrogen-containing gas for a time sufficient to affect substantial uptake of hydrogen, usually no more than one hour, at a temperature of 0° to 200° C. with a hydrogen pressure of 1 to 150 atmospheres.

In a preferred procedure, the reaction is carried out in the presence of ammonia which tends to reduce the formation of by-products. This procedure is operable with proportions of 1–40 moles ammonia per mole cyanoacid.

The active catalyst is finely divided ruthenium which is used as such or on a solid particulate support such as carbon or alumina or in the form of ruthenium oxide or a salt which is readily converted to finely divided ruthenium upon treatment with hydrogen. While any amount of catalyst is operable, hereinafter referred to sometimes as a "catalytic amount," a proportion of 0.01 to 50 grams ruthenium per mole of cyanoacid is practical, while a proportion of 0.2–2.0 grams ruthenium per mole of cyanoacid is preferred. Larger amounts of catalyst than 50 grams per mole of cyanoacid are usually not necessary but are not deleterious.

A reaction temperature of 50° to 150° C. is preferred to maintain the reaction rate within practicable limits and to avoid degradation of amino acid product.

As solvents for the reaction medium, there can be used alcohols such as methanol, ethanol, 1 - propanol, 2 - propanol, any of the butanols or ether alcohols such as 2-methoxyethanol, 2 - ethoxyethanol, 2 - ethoxy - 1 - propanol, 2 - (2 - ethoxy)ethoxyethanol; ethers such as dimethoxymethane, diethoxymethane, dimethoxyethane, diethoxyethane, dimethoxy diethylene glycol, ethyl ether, tetrahydrofuran, dioxane; tertiary amines such as trimethylamine, triethylamine, triethanolamine, N - methylpiperidine; and amides of lower fatty acids such as dimethylformamide.

A hydrogenation pressure of 35–125 atmospheres is preferred. Pressures lower than 35 atmospheres give slower hydrogenation. Pressures higher than 125 atmospheres, while operable and not detrimental, are not necessary.

An amount of hydrogen such as to provide at least 2 moles of hydrogen for each nitrile and oximido group in the cyanoacid is preferred for high yields. Less than 2 moles of hydrogen per mole equivalent of reducible group of cyanoacid gives an incomplete yield, while greater amounts of hydrogen than 2 moles per mole equivalent of reducible group of cyanoacid are not detrimental and insure complete reduction.

An ammonia to cyanoacid ratio of 0–40 moles per mole of cyanoacid is operable, while a proportion of 5–20 moles ammonia per mole of cyanoacid is preferred.

By the process of the present invention, most of the difficulties mentioned above are either avoided or greatly alleviated.

In the practice of this invention, the cyanoacid (or its ammonium salt) is dissolved in a suitable solvent, as described above, the ruthenium catalyst is added to the cyanoacid solution and hydrogenation is then carried out for a short time up to one hour (15–20 minutes is usually sufficient) at 0°–200° C. and under 1–150 atmospheres of hydrogen pressure. After the pressure vessel is cooled and vented, the catalyst is removed by filtration and the ammonia, if used, and solvent are removed by distillation to give a high yield of the desired ω - amino acid in a state of good purity. Usually a single recrystallization from a solvent such as aqueous dimethylformamide will raise the purity to >99 percent, with excellent recovery. The catalyst was found to be equally active after recovery and is therefore re-usable. The process of this invention gives yields of 75–100 percent, usually in excess of 90 percent even after recrystallization of the product amino acid after solvent removal.

The following examples describe completely representative specific embodiments and the best mode contemplated by the inventor of practicing the invention. They are not to be considered as limiting the invention other than as defined in the claims. Parts and percentages therein are by weight unless otherwise stated.

Example 1

To a 1 - liter stainless steel rocking autoclave was charged 36.5 grams of the ammonium salt of 6 - cyanohexanoic acid ($NH(CH_2)_5CO_2H \cdot NH_3$), 2 grams of 5 percent ruthenium on carbon catalyst (Ru/C), and 300 ml. of concentrated ammonium hydroxide (20 percent). The autoclave was sealed, purged with hydrogen, and then pressured to 1000 p.s.i.g. with hydrogen. The bomb was heated with rocking to 110° C. over 20 minutes time, during which period the pressure increased to 1320 p.s.i.g. Hydrogenation was virtually complete after 10 minutes and the autoclave was cooled after 20 minutes. After venting, the material was removed from the autoclave with the aid of 100 ml. of water and the catalyst was removed by filtration. The ammonia was removed by concentrating the solution to about one-third its original volume, and then the volume of the solution was adjusted to 100 ml. with distilled water. The mixture was then warmed to 75° C. and 200 ml. of N,N - dimethylformamide (DMF) was added. The solution was allowed to cool to about 5° C. during which time the amino acid precipitated as white granules. Filtration and drying gave 30.0 grams (90 percent) of 7 - aminoheptanoic acid, M.P. 193.5–194° C. A second crop of less pure material, 1.1 grams, M.P. 178–183° C. was recovered from the mother liquors.

Example 2

To the autoclave described above was charged 39.5 grams of the ammonium salt of 6 - cyanohexanoic acid, 2 grams of 5 percent Ru/C and 300 ml. of concentrated ammonium hydroxide. The autoclave was sealed as before, purged with hydrogen, pressured to 1000 p.s.i.g. with hydrogen and heated rapidly to 115° C. Hydrogenation was virtually complete after 7 minutes. After 20 minutes, the bomb was cooled, vented and opened as before. Work-up in the manner similar to that described in Example 1 gave 32.2 grams of 7 - aminoheptanoic acid, (89 percent), M.P. 193–193.5° C.

Example 3

The procedure of Example 1 was repeated, excepting that 39.5 grams of a mixture containing 91 percent of the ammonium salt of 6 - cyanohexanoic acid and 9 percent ammonium salt of pimelamic acid

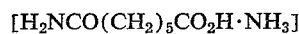
[$H_2NCO(CH_2)_5CO_2H \cdot NH_3$]

was used as the starting material, and the hydrogenation was carried out at 109°–112° C. Recrystallization of the crude product from DMF-$H_2O$ gave 29.1 grams of 7-aminoheptanoic acid (88 percent yield based on ammonium cyanohexanoate charged), M.P. 193–194° C.

Examples 4–14

The following examples were carried out essentially as described in Example 3; the charge in each case was 39.5 grams of a mixture containing 91 percent of the ammonium salt of 6-cyanohexanoic acid and 9 percent ammonium salt of pimelamic acid (0.227 mole of 6-cyanohexanoic acid), 300 ml. of concentrated ammonium hydroxide, and 10 grams of 5 percent Ru/C catalyst. The catalyst from the first run was used without further treatment in the second run, the catalyst from the second run was again used in the third run without further treatment, etc. As the table below shows, essentially no loss in catalytic activity was observed even after 10 cycles. The "yield" column refers to percent yield of 7-aminoheptanoic acid, and the melting points given are those for the product whose percent yield is shown.

TABLE

| Run No. | Pressure Range (p.s.i.g.) | Temp. Range, °C. | Time at Temp., hr. | Percent Yield | M.P., °C. |
|---|---|---|---|---|---|
| 1 | 1,000–1,650 | 110–113 | 0.3 | 85 | 193–194 |
| 2 | 1,000–1,600 | 109–112 | 0.3 | 88 | 193–194 |
| 3 | 1,000–1,560 | 105–113 | 0.5 | 94 | 192.5–193.5 |
| 4 | 1,000–1,500 | 108–113 | 0.5 | 95 | 191 |
| 5 | 1,000–1,420 | 106–110 | 0.5 | 94 | 192 |
| 6 | 1,000–1,600 | 105–110 | 0.3 | 90 | 192.5–193 |
| 7 | 1,000–1,600 | 105–115 | 0.3 | 96 | 193–193.5 |
| 8 | 1,000–1,600 | 107–115 | 0.3 | 94 | 193 |
| 9 | 1,000–1,600 | 105–110 | 0.5 | 92 | 193–194 |
| 10 | 1,000–1,600 | 105–114 | 0.4 | 92 | 193–193.5 |
| 11 | 1,000–1,600 | 110–115 | 0.3 | 94 | 193–193.5 |

Example 15

To the autoclave described above was charged 39.5 grams of the ammonium salt of 6-cyanohexanoic acid, 1.0 gram of 5 percent Ru/alumina catalyst, and 300 ml. of concentrated ammonium hydroxide. The hydrogenation was carried out as described in the above examples at a temperature of 110°–111° and 1100–1500 p.s.i.g. of hydrogen. Hydrogen uptake was virtually complete after 35 minutes. The bomb was cooled, vented, and opened as above. After work-up, 29.3 grams of 7-aminoheptanoic acid, M.P. 191–192° (81 percent yield) was obtained.

Example 16

To the autoclave described above was charged 39.5 grams of a mixture containing 91 percent of the ammonium salt or 6-cyanohexanoic acid, and 9 percent of the ammonium salt of pimelamic acid, 300 ml. of concentrated ammonium hydroxide, and 1.0 gram of ruthenium oxide ($RuO_2$). Hydrogenation was carried out at 1000–1330 p.s.i.g. and 112–119° C. for 20 minutes. Work-up of the product as above gave 30.4 grams (84 percent) of 7-aminoheptanoic acid, M.P. 188–189°.

Example 17

To a copper-jacketed Hastelloy bottle of 500 cc. capacity was charged 15.8 grams of the 91–9 percent mixture of the ammonium salts of 6-cyanohexanoic acid and pimelamic acids, 27 ml. of concentrated aqueous ammonium hydroxide, 265 ml. $H_2O$ and 2 grams of 5 percent Ru/C catalyst. The bottle was sealed, purged with hydrogen and then a heating fluid was passed into the jacket of the bottle to heat the contents to 86°–97° C. The pressure was increased to 50 p.s.i.g. and the mixture was shaken at this pressure for 3 hours. The mixture was then cooled, the pressure released, and the contents of the bottle were filtered to remove the catalyst, yielding a blue solution which contained nickel dissolved from the hydrogenation bottle. Concentration yielded 15.7 grams of the crude amino acid as a light blue solid. The acid was purified by dissolving it in dilute aqueous $NH_4OH$ and passing through a Dowex-50 ($NH_4^+$ form) ion exchange resin to remove the nickel ion. Concentration of the eluents yielded 13.6 grams of crude amino acid, which was recrystallized from 100 ml. of 2:1 DMF-$H_2O$ to yield 7.7 g. (58 percent) of 7-aminoheptanoic acid, M.P. 188.5–189.5°.

When other cyanoacids within the scope of this invention are substituted in place of 6-cyanohexanoic acid, equally advantageous results are obtained with respect to the corresponding $\omega$-amino acids thereby produced. For example, cyanoacetic acid yields 3-aminopropionic acid; 3-cyanopropionic acid yields 4-aminobutyric acid; 4-cyanobutyric acid yields 5-aminovaleric acid; 5-cyanovaleric acid yields 6-aminohexanoic acid; 2-oximido-5-cyanovaleric acid yields DL-lysine; 10-cyanodecanoic acid yields 11-aminoundecanoic acid; 2-oximido-10-cyanodecanoic acid yields 2,11-diaminoundecanoic acid.

The procedures outlined in the above examples can be modified to provide a continuous process by contacting a cyanoacid solution with hydrogen, in proportions as indicated above, with a bed of ruthenium catalyst, advantageously by passing the cyanoacid solution and hydrogen continuously through a bed of ruthenium catalyst.

The following examples are offered as comparative examples to demonstrate the superiority of the above process over conventional catalytic reductions of cyanoacids.

*Comparative Example 1*

To a 1-liter stainless steel autoclave was charged 39.5 grams of the ammonium salt of 6-cyanohexanoic acid, 300 ml. of concentrated ammonium hydroxide, and 1 gram of 5 percent Rh/C catalyst. The bomb was sealed and purged with hydrogen and then pressured to 500 p.s.i.g. with hydrogen. After heating to 134°–138° C. the pressure rose to 700 p.s.i.g., and hydrogenation was continued at 500–750 p.s.i.g. for 1.5 hours. The bomb was cooled, vented, and the contents removed with the aid of 100 ml. of water. The catalyst was removed by filtration, and ammonia was stripped by concentrating the mixture in vacuo to about one-third the volume. The volume of the solution was readjusted to 100 ml. and then diluted with 200 ml. of DMF after heating to 75° C. The solution was allowed to cool to about 5° C. to precipitate the amino acid. Filtration and drying gave 25.1 grams of impure 7-aminoheptanoic acid (69 percent), M.P. 180°–183° C. A number of recrystallizations were required to raise the melting point above 190° C.

*Comparative Example 2*

To the autoclave described above was charged 39.5 grams of a mixture containing 91 percent of the ammonium salt of 6-cyanohexanoic acid, and 9 percent of the ammonium salt of pimelamic acid, 300 ml. of concentrated ammonium hydroxide, and 10 grams of 5 percent Rh/alumina catalyst. The vessel was sealed, purged with hydrogen and then pressured to 1000 p.s.i.g. as before. The temperature was then increased to 106°–110° C. during which time the pressure rose to 1600 p.s.i.g. The pressure was maintained at 1400–1600 p.s.i.g. for 2 hours, and then the autoclave was cooled, vented and opened. Work-up as above yielded 30.8 grams of crude 7-aminoheptanoic acid, M.P. 186°–188° C. Recrystallization from a 2:1 DMF-$H_2O$ mixture gave 21.5 grams (57 percent) of 7-aminoheptanoic acid of a quality comparable to that obtained in the above examples described using the Ru catalyst, M.P. 192.5–193.5° C.

*Comparative Example 3*

To the autoclave described above was charged 39.5 grams of a mixture containing 91 percent of the ammonium salt of 6-cyanohexanoic acid and 9 percent of the ammonium salt of pimelamic acid, 300 ml. of concentrated ammonium hydroxide and 10 grams of 5 percent Pt/C catalyst. The bomb was sealed, purged with hydrogen, pressured to 1000 p.s.i.g. of hydrogen, and then heated to 105°–110° C. for one hour. The pressure was maintained at 1400–1600 p.s.i.g. during this time. The vessel was then cooled, vented and opened. Work-up as above gave 4.3 grams of an orange solid, M.P. 200°–207° C., which was not 7-aminoheptanoic acid.

*Comparative Example 4*

To the autoclave described above was charged 39.5 grams of the 91–9 percent mixture of the ammonium salts of 6-cyanohexanoic acid and pimelamic acid, 300 ml. of concentrated ammonium hydroxide, and 20 grams of 5 percent Pd/C catalyst to which was added 1.2 grams of calcium hydroxide as a catalyst promoter. Hydrogenation as above at 1100–1360 p.s.i.g. for 2.1 hours at 105°–110° C. was followed by cooling, venting and removal of the contents of the bomb. Work-up as described in the above examples gave 7.9 grams of a light yellow solid, M.P. 208°–211° C., which was not 7-aminoheptanoic acid.

*Comparative Example 5*

To the autoclave described above was charged 39.5 grams of the 91–9 percent mixture of the ammonium salts of 6-cyanohexanoic acid and pimelamic acid, 300 ml. of concentrated ammonium hydroxide, and 10 grams of 5 percent Pd/C catalyst. After purging the bomb, an initial hydrogen pressure of 100 p.s.i.g. was added, and the bomb was heated to 101°–109° C. for 1.3 hours during which time the hydrogen pressure was increased to 1500 p.s.i.g. The bomb was cooled, vented and the catalyst was removed by filtration as above. Concentration of the solution to remove the ammonia followed by the adjusting of the final volume to 100 ml., heating to 75° C., and dilution with 200 ml. of DMF at 75° C., followed by cooling gave 6.1 grams of a colorless solid, M.P. 200°–206° C., which was not 7-aminoheptanoic acid.

*Comparative Example 6*

To the autoclave described above was charged 39.5 grams of the 91–9 percent mixture of the ammonium salts of 6-cyanohexanoic acid and pimelamic acid, 300 ml. of concentrated ammonium hydroxide, and 3.3 grams of active Raney nickel catalyst. After purging the initial hydrogen pressure was adjusted to 100 p.s.i.g. and the bomb was heated to 90° C. for one hour during which time the hydrogen pressure was increased to 1500 p.s.i.g. After cooling and venting, the contents of the bomb were removed with the aid of 100 ml. of water and the catalyst was removed by filtration to yield a deep blue, nickel-containing solution which was treated with decolorizing charcoal, and then passed through a column of Dowex 50 ($NH_4^+$ form) ion exchange resin to remove the nickel. The eluent was concentrated in vacuo and then dissolved in 100 ml. of water and heated to 75° C. Dilution with 200 ml. of DMF and cooling yielded 8.8 grams (27 percent) of 7-aminoheptanoic acid, M.P. 185°–187° C.

*Comparative Example 7*

This reduction was carried out in exactly the same manner as Comparative Example 6, excepting that 0.2 gram of calcium hydroxide was added to the 3.3 grams of active Raney nickel catalyst as promoter, and the hydrogenation was carried out at 105°–110° C., and 1400–1500 p.s.i.g. for 1.6 hours. Work-up in exactly the same manner as described in Comparative Example 6 gave 9.2 grams (28 percent) of 7-aminoheptanoic acid, M.P. 190°–191° C.

*Comparative Example 8*

This hydrogenation was carried out in a manner analogous to that in Comparative Example 6 using the same charge and using 2.9 grams of Harshaw nickel catalyst containing 58 percent Ni on $Al_2O_3$. The hydrogenation was carried out using an initial hydrogen pressure of 1200 p.s.i.g. and heating to 110°–113° C. for 20 minutes under a hydrogen pressure of 1400–1625 p.s.i.g. The resulting product after removal of the catalyst was a dark blue, nickel-containing solution, from which the nickel was removed by ion exchange treatment as described in Comparative Example 6. After concentration and continuation of the isolation procedure as described above, 5.6 grams of 7-aminoheptanoic acid, M.P. 188°–191° C. (18 percent yield) was obtained. Increasing the amount of catalyst to 14.5 grams, increasing the amount of ammonium hydroxide to 500 ml., increasing the temperature to 120°–178° C. and changing of the solvent to liquid ammonia in methanol or isopropyl alcohol gave lower yields of considerably less pure product.

*Comparative Example 9*

To the autoclave described above was added 39.5 grams of the 91–9 percent mixture of the ammonia salts of 6-cyanohexanoic acid and pimelamic acid, 200 ml. of isopropyl alcohol, 5 grams of active Raney nickel and 42.5 grams of liquid ammonia. Hydrogenation as above at 1550–1850 p.s.i.g. and 100°–110° C. for 4 hours resulted in uptake of about 30 percent of the theoretical amount of hydrogen. The bomb was cooled, vented and the product was removed with the aid of distilled water. Filtration of the solution to remove the catalyst yielded a dark blue, nickel-containing solution from which the nickel was removed by ion exchange as in Comparative Example 6. There resulted 10.3 grams of 7-aminoheptanoic acid (31 percent), M.P. 186°–188° C. Changing the solvent to methanol did not have any beneficial effect.

*Comparative Example 10*

To the autoclave described above was charged 63.2 grams of the 91–9 mixture of the ammonium salts of 6-cyanohexanoic acid and pimelamic acid, 20 grams of a cobalt oxide catalyst (Girdler Catalyst T–300, containing 60 percent cobalt oxide on kieselguhr), 240 ml. of dry methanol, and 68 grams of liquid ammonia. The bomb was sealed, purged with hydrogen and pressured to 1000 p.s.i.g. before heating. The hydrogenation was carried out at 105°–109° C. for 4 hours and under 1600 p.s.i.g. of hydrogen. After cooling and venting, the product was removed with the aid of 200 ml. of water and filtered to remove the catalyst. The resulting very dark brown, cobalt-containing solution was diluted with water to make an approximately 10 percent aqueous solution and passed through the acid form of Dowex 50W ion exchange resin to remove the cobalt. The amino acid was eluted with 5 percent aqueous ammonium hydroxide. Concentration of the eluents to less than 100 ml. volume effected removal of the ammonia. After the volume was adjusted to 110 ml. with distilled water, the solution was heated to 75° C. and then diluted with 200 ml. of hot (98° C.) DMF and then the mixture was cooled to −17° C. to effect crystallization. Only a very slight amount of solid was obtained. A considerable amount of starting 6-cyanohexanoic acid was recovered, indicating that little if any of the nitrile group was reduced.

*Comparative Example 11*

This reaction was carried out using the same charge and in a similar manner to that of Comparative Example 10 with the exception that the catalyst was 20 grams of a cobalt catalyst (Girdler T–301 cobalt catalyst on a special support for liquid phase reaction, containing 35 percent cobalt metal). Hydrogenation was carried out at 103°–108° C. over a period of 3.2 hours. However, after the contents of the bomb were removed and worked up in a manner similar to the previous example, it was found that a large amount of the cobalt had gone into solution and no product could be isolated. The presence of a considerable amount of the starting material was detected.

What is claimed is:

1. Method for making an omega-amino acid which comprises hydrogenating a water or aqueous ammonium hydroxide solution of a cyanoacid reactant having the formula $$NC(CH_2)_n-C(R_1R_2)CO_2NH_4$$

wherein $n$ is an integer from 0 to 9, $R_1$ and $R_2$ individually are H and taken together are =NOH, with hydrogen at a temperature between 0° and 200° C. and a hydrogen pressure of at least 1 atmosphere in the presence of a catalytic amount of ruthenium.

2. Method for making an omega-amino acid which comprises hydrogenating a water or aqueous ammonium hydroxide solution of a cyanoacid reactant having the formula $$NC(CH_2)_n-C(R_1R_2)CO_2NH_4$$

wherein $n$ is an integer from 0 to 9, $R_1$ and $R_2$ individually are H and taken together are =NOH, with hydrogen at a temperature between 0° and 200° C. and a hydrogen pressure of at least 1 atmosphere in the presence of ammonia and of a catalytic amount of ruthenium.

3. Method for making an omega-amino acid which comprises hydrogenating a water or aqueous ammonium hydroxide solution of a cyanoacid reactant having the formula $$NC(CH_2)_n-C(R_1R_2)CO_2NH_4$$

wherein $n$ is an integer from 0 to 9, $R_1$ and $R_2$ individually are H and taken together are =NOH, with a proportion of at least 2 moles of hydrogen, 0.01–50 grams ruthenium catalyst per mole of cyanoacid at a temperature between 50° and 150° C. and a hydrogen pressure of 35–125 atmospheres for a time sufficient to reduce the —CN and =NOH groups and recovering therefrom the corresponding omega-amino acid.

4. Method for making an omega-amino acid which comprises hydrogenating a water or aqueous ammonium hydroxide solution of a cyanoacid reactant having the formula $$NC(CH_2)_n-C(R_1R_2)CO_2NH_4$$

wherein $n$ is an integer from 0 to 9, $R_1$ and $R_2$ individually are H and taken together are =NOH, with a proportion of at least 2 moles of hydrogen, 0.01–50 grams ruthenium catalyst and 1–40 moles ammonia per mole of cyanoacid at a temperature between 50° and 150° C. and a hydrogen pressure of 35–125 atmospheres for a time sufficient to reduce the —CN and =NOH groups and recovering therefrom the corresponding omega-amino acid.

5. The method of claim 4, wherein the cyanoacid reactant is the ammonium salt of 3-cyanopropionic acid.

6. The method of claim 4, wherein the cyanoacid reactant is the ammonium salt of 6-cyanohexanoic acid.

7. The method of claim 4, wherein the cyanoacid reactant is the ammonium salt of 2-oximido-5-cyanovaleric acid.

8. The method of claim 4, wherein the cyanoacid reactant is the ammonium salt of 10-cyanodecanoic acid.

9. A method for making 7-aminoheptanoic acid which comprises hydrogenating a mixture of 36.5 weight parts 6-cyanohexanoic acid, 269 weight parts aqueous 28 percent ammonium hydroxide, 2 weight parts 5 percent ruthenium on carbon in a hydrogen atmosphere at a pressure ranging between 1000 and 1320 p.s.i.g. at a temperature up to 110° C. for a time sufficient to reduce the —CN group to the —CH$_2$NH$_2$ group and recovering 7-aminoheptanoic acid.

References Cited

UNITED STATES PATENTS

| | | | |
|---|---|---|---|
| 2,690,456 | 9/1954 | Renfrew | 260—583 |
| 2,999,875 | 9/1961 | Ferris et al. | 260—534 X |
| 3,117,162 | 1/1964 | Rylander et al. | 260—583 |

LORRAINE A. WEINBERGER, *Primary Examiner.*

L. ZITVER, *Examiner.*

D. P. CLARKE, A. P. HALLUIN, *Assistant Examiners.*